United States Patent [19]

Horne

[11] Patent Number: 5,004,292
[45] Date of Patent: Apr. 2, 1991

[54] VEHICLE WINDOWSILL PROTECTIVE COVERING AND ARM REST APPARATUS

[76] Inventor: G. Kent Horne, 9529 N. 34th La., Phoenix, Ariz. 85051

[21] Appl. No.: 462,235

[22] Filed: Jan. 9, 1990

[51] Int. Cl.$^5$ .............................................. B60J 9/00
[52] U.S. Cl. .................................. 296/153; 297/413; 248/118; 49/377
[58] Field of Search ............... 296/152, 153; 297/412, 297/413; 248/118; 49/377

[56] References Cited

U.S. PATENT DOCUMENTS

| 1,756,694 | 4/1930 | Loehr | 248/118 X |
| 2,462,768 | 2/1949 | Ortleb | 297/413 X |
| 2,670,235 | 2/1954 | Susil | 296/153 |
| 2,711,344 | 6/1955 | Larson | 296/153 |
| 2,738,220 | 3/1956 | Simmons | 296/153 |
| 3,129,974 | 4/1964 | Carter | 296/153 |
| 4,592,584 | 6/1986 | White, Jr. | 296/153 |
| 4,758,043 | 7/1988 | Reynaldos | 296/153 |

FOREIGN PATENT DOCUMENTS 17126 12/1956 Fed. Rep. of Germany ...... 296/153

Primary Examiner—Margaret A. Focarino
Assistant Examiner—Andrew C. Pike
Attorney, Agent, or Firm—H. Gordon Shields

[57] ABSTRACT

Windowsill protective cover and arm rest apparatus includes a pad which is disposed on the interior of the windowsill of a vehicle door panel. A relatively short downwardly extending base portion secured to the pad extends downwardly between the window glass the door panel. The base portion includes a gasket or sealing portion disposed against the door panel and a locking portion that engages a lower portion of a gasket which normally abuts the window glass on the interior of the door frame. The window glass may be raised and lowered without disturbing the apparatus. The apparatus serves a protective function for the vehicle door sill and a cushion function for cushioning a user's arm as the arm rests on the door sill.

11 Claims, 1 Drawing Sheet

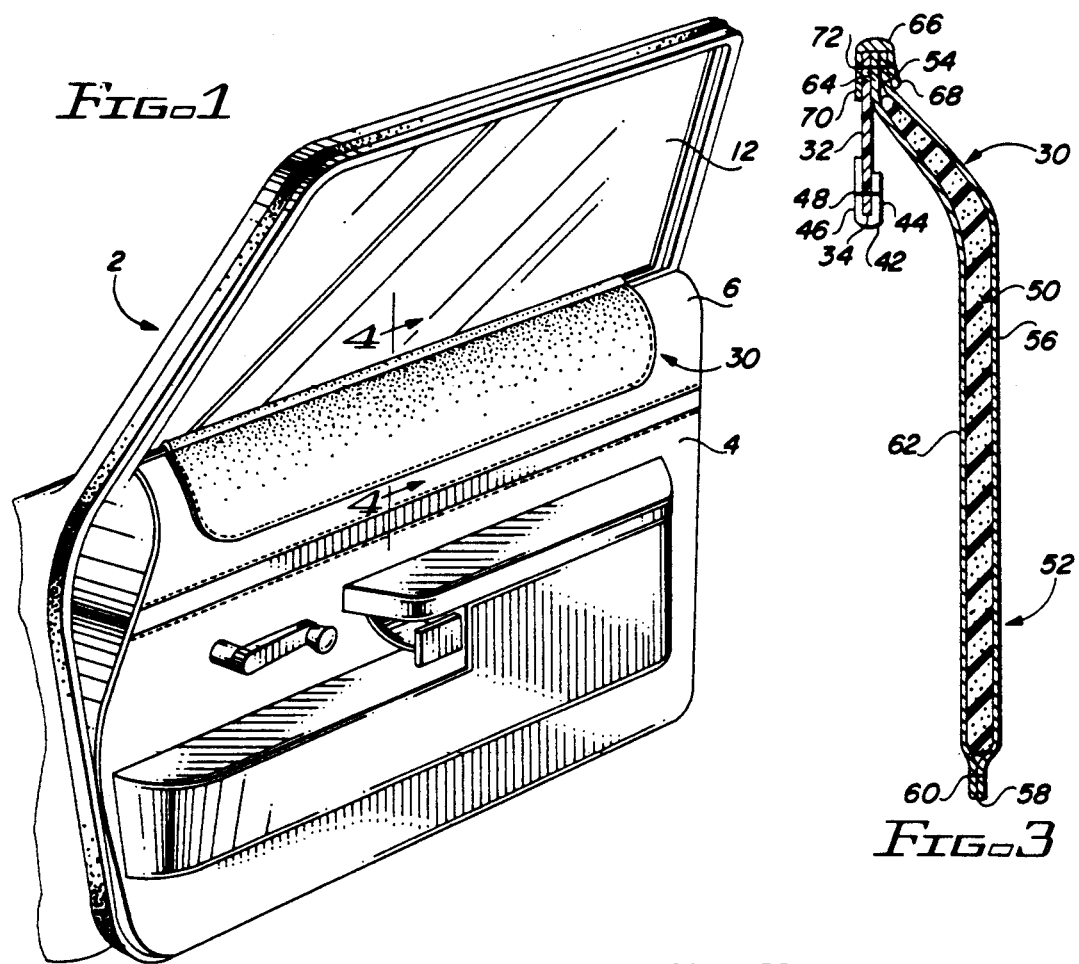
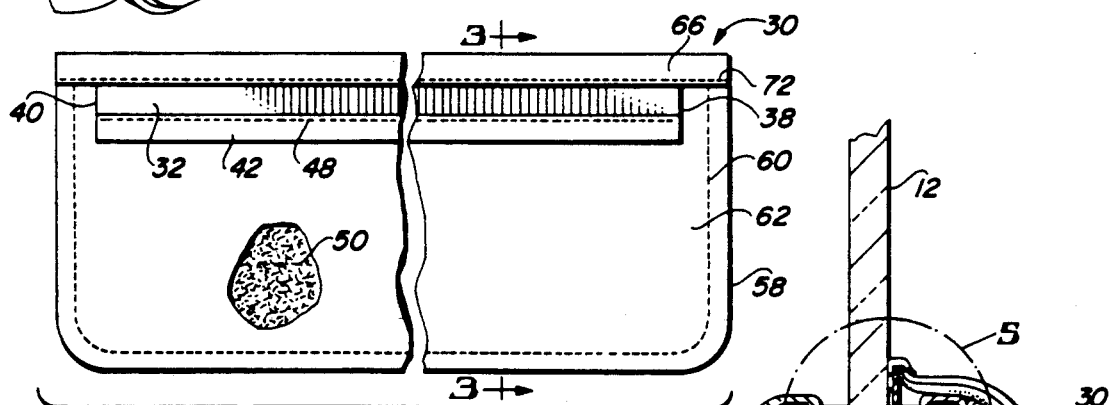
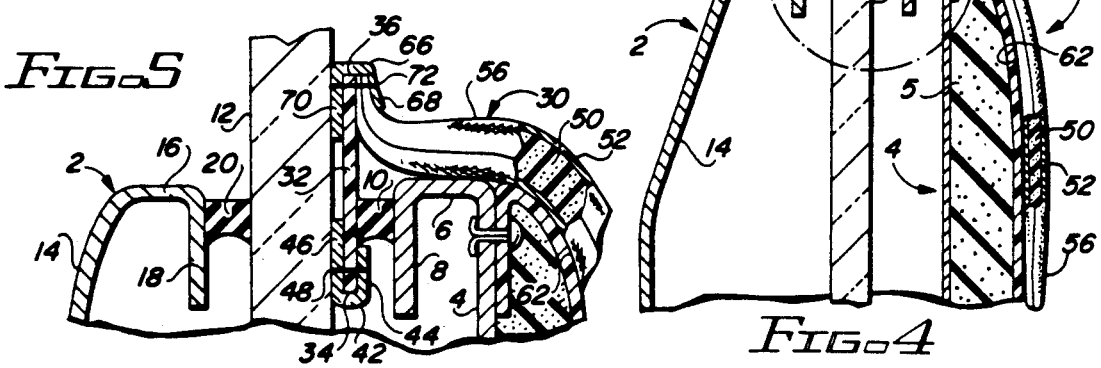

VEHICLE WINDOWSILL PROTECTIVE CONVERING AND ARM REST APPARATUS

SUMMARY OF THE INVENTION

1. Field of the Invention

This invention relates to vehicle windowsill covering apparatus and, more particularly, to a protective covering and arm rest pad for vehicle door panels.

2. Description of the Prior Art

U.S. Pat. No. 2,274,026 (Allen) discloses an arm protector for automobile doors which includes three separate elements. The first element is what is referred to as an L-shaped shield, with a relatively short arm which extends downwardly between the automobile window and the inside door panel, the second element is a flap member which is designed to extend onto the outer portion of the door frame, and the third element is a hinge which connects the shield and the flap. The shield is designed to be permanently affixed to the door. The flap folds on the inside of the shield when the window is rolled up, and when the window is rolled down, the flap extends outwardly onto the outer part of the door frame.

U.S. Pat. No. 2,462,768 (Ortleb) discloses a protector pad which includes two separate portions. The two portions are connected together or are secured together by being looped about a stiffening element. The stiffening element, with the two portions secured thereto, is adapted to be disposed against the window on the inside of the door frame. With the window rolled down, one portion extends outwardly over the rolled down window and the other portion of the door frame, and the other portion extends inwardly over the interior portion of the door frame. The apparatus also includes clips extending about the stiffening member and upwardly, over the interior of the door frame.

U.S. Pat. No. 2,617,679 (Maguire) discloses body belt molding apparatus for a vehicle body. The apparatus is designed to be permanently secured as molding on a vehicle body, particularly adjacent to movable glass members, such as on doors and adjacent to doors in vehicles with convertible tops.

U.S. Pat. No. 2,709,620 (Tinsley et al.) discloses an automobile arm rest apparatus which includes a concavely configured plate with padding on the outer portion of the plate. Secured to the central portion of the convex element is a downwardly extending spring element having a V-shaped configuration. One arm of the Vee is secured to the plate, while the V-shaped portion extends downwardly therefrom and is disposed between the vehicle frame and the window.

U.S. Pat. No. 2,711,344 (Larson) discloses another type of arm rest protector for an automotive vehicle. The arm rest protector includes a generally flat plate portion secured to a wire frame. The wire frame includes bent portions designed to lock between the window glass and the adjacent portion of the frame of the vehicle. It appears that once locked in place, it may not be easily removed. The flap moves and pivots on the frame from an upper, use position, where the flap is disposed on the top of the door frame, with the window rolled down, to the storage position on the inside of the door, as when the window is rolled up.

U.S. Pat. No. 4,758,043 (Reynaldos) discloses a flap for an automotive vehicle window which includes a pair of legs at opposite ends of the flap which extend on the inside of the vehicle and are appropriately secured to the inside of the vehicle door. The flap then extends upwardly from the arms and outwardly over the door frame. The outer portion of the flap, remote from the arms, includes magnetic elements to secure the flap to the exterior of the door while in use.

U.S. Pat. No. 4,805,957 (Fletcher) discloses a combination window sill arm rest and sun screen. The apparatus includes essentially two different portions, an outer portion which magnetically attaches to the outside of the door, and an inner portion which drapes over the door and over the window and is loosely disposed on the inside of the door frame. When the window is rolled up, the magnetically attached portion remains in place, and the inside portion simply moves upwardly on the window to comprise a window screen portion.

It will be noted that all of the above apparatus include various types of limitations of inconveniences. Some are easily removed, but others are not. Some require relatively permanent attachements to some part of the vehicle, and others include relatively rigid frames disposed either on the interior of the vehicle or downwardly inside the door between the glass and the door frame.

The apparatus of the present invention overcomes the deficiencies of the prior art by providing an element which is relatively easily installed and relatively easily removed, as desired. The apparatus may conveniently be used whether the window is up or down. The apparatus includes a cushioning or sealing element disposed against the window so that the window will not be scratched or hindered in its upwardly and downwardly movements. At the same time, the apparatus provides a convenient covering over the interior portion of the door frame to protect the interior of the door frame from both ultraviolet rays and from body oils, etc., from a user's arm disposed on the window sill. In addition, the apparatus provides a cushion or pad for the user's arm.

SUMMARY OF THE INVENTION

The invention described and claimed herein comprises a pad element secured to a relatively short strip of relatively stiff material designed to extend downwardly between a door frame and a window in the door frame. The relatively flexible strip includes cushioning material secured to it disposed against the window on one side and against a sealing gasket on the opposite side. The portion disposed against the sealing gasket acts as a lock to secure the apparatus in place between the window glass and the frame portion of the door. The pad is flexible and accordingly will conform to a particular configuration of the vehicle door panel.

Among the objects of the present invention are the following:

To provide new and useful apparatus for protecting the interior of a vehicle door panel adjacent to the vehicle window;

To provide new and useful pad apparatus for the arm of a user of a vehicle;

To provide new and useful arm protector pad apparatus secured to a door frame adjacent to a window that will remain in place while the window is rolled up and down;

To provide new and useful pad apparatus for protecting an interior vehicle door panel from ultraviolet radiation;

To provide new and useful pad apparatus secured to a door frame of a vehicle between the vehicle glass and the frame;

To provide new and useful pad apparatus easily insertable into and removable from a door frame of a vehicle; and To provide new and useful apparatus relatively permanently installed in a vehicle door frame but easily removable from the door frame.

BRIEF DESCRIPTION OF THE DRAWING

FIG. 1 is a perspective view of the apparatus of the present invention in its use environment.

FIG. 2 is a plan view, partially broken away, of the apparatus of the present invention.

FIG. 3 is a view in partial section taken generally along line 3—3 of FIG. 2.

FIG. 4 is an enlarged view in partial section taken generally along line 4—4 of FIG. 1.

FIG. 5 is an enlarged view in partial section of a portion of the apparatus of FIG. 4, taken generally from Circle 5 of FIG. 4.

DESCRIPTION OF THE PREFERRED EMBODIMENT

FIG. 1 is a perspective view of a vehicle door 2 with the protective covering and arm rest apparatus 30 of the present invention disposed on the vehicle door. The vehicle door includes an inner door panel 4, and the door panel 4 includes a curved top or upper portion 6 adjacent to a window 12. The covering and arm rest apparatus 30 is disposed adjacent to the window 12 and on the curved portion 6, and it extends downwardly onto the door panel 4 from the top portion 6.

FIG. 2 is a plan view of the covering and arm rest apparatus 30 of the present invention. FIG. 3 is a view in partial section of the apparatus 30 taken generally along line 3—3 of FIG. 2. FIG. 4 is a view in partial section of the apparatus 30 disposed on the door panel 4 of the door 2 taken generally along line 4—4 of FIG. 1. FIG. 5 is an enlarged view of a portion of FIG. 4 taken generally from Circle 5 of FIG. 4 and illustrating in some detail the securing of the apparatus 30 to the door panel 4 at the window 12. For the following discussion, reference will be made to all five of the Figures.

As best shown in FIGS. 4 and 5, the inner door panel 4 includes the top, generally curved portion 6 extending downwardly from the top of the door panel. Padding 5 is shown secured to the outside of the door panel 4 in FIG. 4, but not in FIG. 5. As is well known and understood, some door panels may include padding and some may not. An inside portion 8 of the panel 4 extends downwardly from the top portion 6. A sealing gasket 10 is appropriately secured to the inside portion 8 and the gasket 10 extends from the inside portion 8 to the window 12. The gasket 10, as is well known and understood in the art, actually comes in different sizes and physical configurations, depending on a particular make and model of a vehicle. The door 2 illustrated in the drawing and discussed herein is an idealized or generic type of door, knowing and understanding that it would be difficult, if not virtually impossible, to illustrate each different type of vehicle door, door panel, and gasket. However, it will be understood that a gasket, typically made of rubber, extends between the door panel and the window in virtually all contemporary vehicles. The apparatus of the present invention is designed to matingly engage the gasket to hold the apparatus in place on a vehicle door panel, with a portion of the apparatus disposed against the inside of the vehicle window and a portion disposed on the top and outside of the door panel.

The vehicle door 2 also includes an outer door panel 14, with a top portion 16 and an inner portion 18. A second seal or sealing gasket 20 is appropriately secured to the inner portion 18 and extends from the inner portion 18 to the window 12.

The protective covering and arm rest apparatus 30 includes a base element 32, which is preferably a relatively stiff and yet somewhat flexible element. The element 32 is preferably made of some type of synthetic material. As shown in FIG. 2, the base element 32 extends nearly the entire length of the apparatus 30. However, as shown in FIGS. 2, 3, 4, and 5, the base element 32 is relatively short, or it has a relatively short height, as compared to the overall height of the apparatus 30.

The base element 32 includes a bottom edge 34, a top edge 36 spaced apart a relatively short distance from the bottom edge 34, as intimated in the preceding paragraph, and a pair of sides or end edges 38 and 40 spaced apart from each other and extending between the bottom edge 34 and the top edge 36. The edges 38 and 40 are illustrated in FIG. 2 as being spaced apart a relatively long distance as compared to the height of the base element 32, or the distance between the bottom edge 34 and the top edge 36. The base element may be considered as having two faces, an outer face disposed adjacent to the window 12 and an inner face remote from the window.

Covering the bottom edge 34, and extending part way up the faces of the base element 32, is an bottom cap 42. The bottom cap 42 is a generally U-shaped element, preferably made of material such as felt, vinyl, or the like, and includes an arm 44 and an arm 46. Stitching 48 may be used to secure the bottom cap 42 to the lower portion of the base element 32. Alternatively, the bottom cap 42 may be adhesively secured to the base element 32.

Appropriately secured to the upper portion of the base element 32, adjacent to its top edge 36, is a pad or padding 50. The pad or padding 50 is disposed within a covering 52. The covering 52 includes an end portion 54 at the top edge of the pad 50 and adjacent to the upper portion of the base element 32. From the end portion 54, the cover 52 includes a top or outer side portion 56. The top or outer side portion 56 extends downwardly from the end portion 54 to an outer or bottom edge 58. From the bottom or outer edge 58, the cover 52 extends upwardly on the opposite side of the padding 50 to define a back side 62. The back side 62 is disposed on the inner door panel 4 and against its padding 5, if such padding is present, as shown in FIG. 4. The back side 62 extends from the outer edge 58 to a second end portion 64. The end portion 64 is disposed against the end portion 54.

The cover 52 is preferably adhesively secured to the padding 50. The outer edges of the cover 52 and the padding 50 are preferably stitched with an interlock or serged stitch 60.

A top cap 66 is disposed over the padding 50, its cover 52, and both end portions 54 and 64 of the cover 52, at the top edge 36 of the base element 32. The base element 32 is thus disposed generally parallel to and against the padding 50 and its cover 52. The top cap 66 includes an arm 68 which extends over the padding 50 and its cover 52, and an arm 70 which extends along the upper portion of the base element 32. The top cap 66 secures the arms 68 and 70 to the base element 32 and to the padding 50 and its cover 52 by means of an interlock or serged stitch 72.

It will be understood that the padding portion 50, and its cover 52, is relatively flexible, and accordingly will conform to the particular configuration of the door panel adjacent to the window. However, with respect to the vertical orientation of the base element 32, the base element 32 is relatively inflexible. As shown in FIGS. 4 and 5, and best in FIG. 5, the base element 32 is moved downwardly along the inside of the window 12 to beneath the seal or gasket 10. The arm portions 46 and 70 of the bottom cap 42 and top cap 66, respectively, are disposed in abutting relationship with the window 12. The inner arm 44 of the bottom cap 42, and particularly the upper edge of the inner arm, acts as a stop against the bottom portion of the seal or gasket 10. Accordingly, the base element 32 remains in the position illustrated in FIGS. 4 and 5, which is also the position shown in FIG. 1, as the window 12 is moved upwardly and downwardly. The apparatus 30 remains in position and is not easily dislodged. However, if desired, the apparatus 30 may be removed from a window relatively easily.

With the window 12 in its down position, or up a relatively short distance, the apparatus 30 may be held as illustrated in FIG. 3, with the base element 32 spaced apart slightly from the pad 50 and its cover 52. The pad apparatus 30 is then slightly tilted so that the edge 38 of the base element 32 is extending downwardly at an oblique angle. The base element 32 is then moved downwardly between the window 12 and the gasket 10 and the base element 32 is moved downwardly until the bottom cap 42 is beneath the seal or gasket 10. The apparatus 30 is then moved along the top portion 6 of the door panel 4 until the base element 32 is in its full down position, which is the position of the pad apparatus 30 best understood from FIG. 1 and from FIGS. 4 and 5.

Once the pad 30 is in its full down, or use, position, the window 12 may be moved upwardly and downwardly without dislodging the apparatus 30. A user's arm may conveniently rest on the pad 50 and its cover 52, as desired. The apparatus 30 comprises both a pad on which an arm may be disposed, and a protective barrier to protect the door panel 4 and its padding 5 from ultraviolet rays of the sun and from chemicals, oils, etc., in the sweat or on the user's arm disposed on the apparatus 30.

The apparatus 30 may be removed from the door 2 in the reverse manner from which it was inserted. That is, the window is preferably moved downwardly to its bottom position or very close thereto, and an outer edge or end of the apparatus 30 is moved away from the window and pulled upwardly and longitudinally to remove a portion of the base element 32 from between the window 12 and the seal or gasket 10. The apparatus 30 is then gently pulled longitudinally away from the window 12 and seal 10 until the apparatus is completely free from the window and seal. If desired, the apparatus 30 may also be removed in substantially the same manner as discussed, even if or when the window is in the up position.

As shown in FIG. 1, and as well known and understood, few, if any vehicle windows are absolutely square. Typically, there is a slant at one or both outer edges of the windows. Moreover, when the window is moved downwardly, to nearly its full down position or very close thereto, there is a space between the window and the gasket or seal. It is at this location that the apparatus 30 is best installed and removed.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Sill covering and arm rest pad apparatus for a vehicle having a window movable upwardly and downwardly, a door panel, a gasket extending between the window and the door panel, a bottom on the gasket, and a sill on the door panel adjacent to the window, the sill covering and arm rest pad apparatus comprising, in combination:
   base element means, including
      a base element disposed between the window and the gasket and extending below the gasket,
      a top edge on the base element, and
      stop means spaced apart from the top edge and disposed against the bottom of the gasket for preventing the apparatus from moving as the window is moved upwardly;
   pad means disposed generally parallel to and against the base element and secured to the base element adjacent to the top edge of the base element for covering the sill and the door panel adjacent to the sill; and
   a top cap secured to the base element and to the pad means.

2. The apparatus of claim 1 in which the base element of the base element means further includes:
   a bottom edge, and
   a pair of side edges spaced apart from each other and extending between the bottom and the top edges.

3. The apparatus of claim 1 in which the base element of the base element means comprises a relatively stiff element having a bottom edge spaced apart from the top edge a relatively short distance, and a pair of side edges extending between the top and bottom edges and spaced apart from each other a relatively long distance.

4. The apparatus of claim 3 in which the base element means further includes a bottom cap along the bottom edge of the base element, and the bottom cap includes a first arm contacting the gasket to comprise the stop means to prevent the apparatus from moving as the window is moved upwardly.

5. The apparatus of claim 4 in which the bottom cap includes a second arm contacting the window as the window moves upwardly and downwardly.

6. Sill covering and arm rest pad apparatus for a vehicle having a window movable upwardly and downwardly, a door panel, a gasket extending between the window and the door panel, a bottom on the gasket, and a sill on the door panel adjacent to the window, the sill covering and arm rest pad apparatus comprising, in combination:
   base element means, including a base element disposed between the window and the gasket and extending above and below the gasket, a top edge on the base element, above the gasket and stop means spaced apart from the top edge and disposed against the bottom of the gasket for preventing the apparatus from moving as the window is moved upwardly; and pad means disposed generally parallel to and against the base element and secured to the base element adjacent to the top edge of the base element for covering the sill and the door panel adjacent to the sill.

7. The apparatus of claim 6 in which the base element of the base element means comprises a relatively stiff element having a bottom edge spaced apart from the top edge a relatively short distance, and a pair of side edges exteding between the top and bottom edges and spaced apart from each other a relatively long distance.

8. The apparatus of claim 7 in which the base element means further includes a bottom cap disposed along and secured to the bottom edge of the base element, and the bottom cap includes a first arm contacting the gasket to comprise the stop means for preventing the apparatus from moving as the window is moved upwardly.

9. The apparatus of claim 8 in which the bottom cap further includes a second arm contacting the window as the window moves upwardly and downwardly.

10. The apparatus of claim 6 in which the base element of the base element means further includes:

a bottom edge, and a pair of side edges spaced apart from each other and extending between the bottom and the top edges.

11. The apparatus of claim 6 in which the base element means includes a top cap secured to the base element and to the pad means.

* * * * *